United States Patent
Mizutani et al.

(10) Patent No.: US 7,543,746 B2
(45) Date of Patent: Jun. 9, 2009

(54) PORTABLE TERMINAL SYSTEM INCLUDING PORTABLE TERMINAL MOUNTING BASE

(75) Inventors: Tomokazu Mizutani, Chiryu (JP); Hisashi Shigekusa, Okazaki (JP)

(73) Assignee: Denso Wave Incorporated, Tokyo (JP)

( * ) Notice: Subject to any disclaimer, the term of this patent is extended or adjusted under 35 U.S.C. 154(b) by 544 days.

(21) Appl. No.: 11/156,452

(22) Filed: Jun. 21, 2005

(65) Prior Publication Data
US 2006/0006234 A1    Jan. 12, 2006

(30) Foreign Application Priority Data
Jul. 7, 2004    (JP) .............................. 2004-200481

(51) Int. Cl.
*G06K 7/08*    (2006.01)
(52) U.S. Cl. ................. 235/451; 235/385; 235/462.43; 235/472.01
(58) Field of Classification Search ................. 235/385, 235/451, 472.01, 492, 462.43, 462.44, 462.46, 235/472.02, 472.03
See application file for complete search history.

(56) References Cited
U.S. PATENT DOCUMENTS
6,025,780 A * 2/2000 Bowers et al. ............ 340/572.3
6,976,626 B2 * 12/2005 Schmidt et al. ........ 235/462.01

FOREIGN PATENT DOCUMENTS

| JP | A-2000-261355 | 9/2000 |
|---|---|---|
| JP | 2001-52105 | 2/2001 |
| JP | A-2002-269508 | 9/2002 |
| JP | A-2003-255069 | 9/2003 |
| JP | A-2003-296682 | 10/2003 |

OTHER PUBLICATIONS

Office Action dated Jan. 27, 2009 in corresponding Japanaese patent application No. 2004-200481 (and English translation).

* cited by examiner

*Primary Examiner*—Seung H Lee
(74) *Attorney, Agent, or Firm*—Posz Law Group, PLC (57) ABSTRACT

In a portable terminal system, a mounting base is equipped with a RFID section capable of performing RF communication with a RFID section of a portable terminal. As soon as the portable terminal is placed on the mounting base, both RFID sections start RF communication so that the data having been read from a RFID tag into the portable terminal can be quickly transmitted from the portable terminal to the mounting base. The data being transmitted from the portable terminal to the mounting base is further transmitted from the mounting base to a host computer. Thus, the portable terminal can use a common interface to read the data from the RFID tag and also transmit the data having been read from the RFID tag to the mounting base.

11 Claims, 5 Drawing Sheets

PORTABLE TERMINAL SYSTEM INCLUDING PORTABLE TERMINAL MOUNTING BASE

CROSS-REFERENCE TO RELATED APPLICATION

This application is based upon and claims the benefit of priority from earlier Japanese Patent Application No. 2004-200481 filed on Jul. 7, 2004 so that the description of which is incorporated herein by reference.

BACKGROUND OF THE INVENTION

The present invention relates to a portable terminal system including a portable terminal capable of performing RF communication (i.e. radio frequency communication) with a RFID tag (i.e. radio frequency ID tag) and operating under an operating power supplied from a battery, and a portable terminal mounting base capable of performing data communication with an external apparatus and having an arrangement to mount the portable terminal.

For example, the unexamined Japanese Patent Application Laid-open No. 2001-52105 discloses a composite code reading apparatus which reads data from a RFID tag attached or printed on an objective article or product to be administrated and transmits the data read out from the RFID tag to an external apparatus.

However, the composite code reading apparatus disclosed in the above-described prior art document has complicated hardware arrangement because one interface is provided to read data from the RFID tag and another interface is separately provided to transmit the data read out from the RFID tag to the external apparatus.

According to the portable terminal system, a portable terminal having the capability of reading a RFID tag is placed on a portable terminal mounting base (hereinafter, referred to as a mounting base). When the portable terminal is placed on the mounting base, the data having been read from the RFID tag into the portable terminal is transmitted from the portable terminal to the mounting base. The data transmitted from the portable terminal to the mounting base is further transmitted from the mounting base to the host computer. The data having been read from the RFID tag into the portable terminal is thus transmitted from the portable terminal via the mounting base to the host computer.

However, this kind of portable terminal system has the same problem as that of the above-described conventional composite code reading apparatus. More specifically, the overall hardware arrangement becomes complicated because one interface is required to read the data from the RFID tag into the portable terminal and another interface is separately arranged to transmit the data of the RFID tag from the portable terminal to the mounting base.

SUMMARY OF THE INVENTION

In view of the above-described problems, the present invention has an object to provide a portable terminal system capable of simplifying overall hardware arrangement of the portable terminal and appropriately transmitting data of a RFID tag (i.e. radio frequency ID tag) from a portable terminal to an external apparatus via a mounting base.

Furthermore, the present invention has an object to provide a mounting base for mounting a portable terminal used in a portable terminal system.

In order to accomplish the above and other related objects, the present invention provides a portable terminal system including a portable terminal including a first RFID means capable of performing RF communication with a RFID tag and operating under an operating power supplied from a battery, and a portable terminal mounting base including an external communication means capable of performing data communication with an external apparatus and having an arrangement to mount the portable terminal. The portable terminal mounting base includes a second RFID means capable of performing RF communication with the first RFID means. The portable terminal mounting base transmits data via the external communication means to the external apparatus, when the first RFID means transmits the data to the second RFID means based on RF communication. And, the portable terminal mounting base transmits data via the second RFID means to the first RFID means based on RF communication, when the external apparatus transmits the data to the external communication means. The portable terminal system of the present invention is characterized in that the portable terminal mounting base includes the second RFID means capable of performing RF communication with the first RFID means equipped in the portable terminal performing RF communication with the RFID tag. For example, when the portable terminal is placed on the portable terminal mounting base, the first RFID means of the portable terminal transmits data to the second RFID means of the portable terminal mounting base based on RF communication. Then, the portable terminal mounting base transmits the received data via the external communication means to the external apparatus. Meanwhile, when the external apparatus transmits data to the external communication means, the portable terminal mounting base transmits the received data via the second RFID means to the first RFID means of the portable terminal based on RF communication.

Providing the second RFID means in the portable terminal mounting base brings the effect of simplifying the overall hardware arrangement of the portable terminal because a common interface can be used to read the data from the RFID tag and also transmit the data having been read from the RFID tag to the portable terminal mounting base. Furthermore, as an overall system, the data of the RFID tag having been read into the portable terminal can be appropriately transmitted from the portable terminal to the external apparatus via the portable terminal mounting base.

According to the portable terminal system of the present invention, it is preferable that the first RFID means operates as a RFID master station for performing RF communication with the RFID tag, and also operates as a RFID slave station having identification information inherent to the portable terminal. The second RFID means operates as a RFID master station performing RF communication with the first RFID means under the condition that identified result of identification information is true in the communication with the first RFID means operating as the RFID slave station. Accordingly, the portable terminal mounting base does not perform RF communication unconditionally with all of the portable terminals. Only when identified result of the identification information of a concerned portable terminal is true, the portable terminal mounting base performs RF communication with this portable terminal. Thus, it becomes possible to enhance the security of the communication performed between the portable terminal mounting base and the portable terminals.

According to the portable terminal system of the present invention, it is preferable that the first RFID means operates selectively as the RFID master station or the RFID slave station. For example, it is possible to arrange the first RFID means so as to switch its operation mode form the RFID master station to the RFID slave station when the portable terminal is placed on the portable terminal mounting base. This enables the portable terminal to quickly shift into a condition capable of transmitting the data of the RFID tag to the portable terminal mounting base as soon as the portable terminal is placed on the portable terminal mounting base. On the other hand, it is possible to arrange the first RFID means so as to return its operation mode form the RFID slave station to the RFID master station when the portable terminal is removed from the portable terminal mounting base. This enables the portable terminal to quickly shift into a condition capable of reading data from the RFID tag as soon as the portable terminal is removed from portable terminal mounting base.

According to the portable terminal system of the present invention, it is preferable that the first RFID means supplies operating power to the RFID tag when the first RFID means operates as the RFID master station and performs RF communication with the RFID tag. And, the second RFID means supplies operating power to the first RFID means when the second RFID means performs RF communication with the first RFID means operating as the RFID slave station.

This arrangement enables the portable terminal to supply operating power to the RFID tag under a condition that the RFID tag cannot produce operating power. With this arrangement, the RFID tag can operate under the operating power transmitted from the portable terminal and can transmit its data to the portable terminal. The portable terminal can read the data received from the RFID tag. Furthermore, the above arrangement enables the portable terminal mounting base to supply operating power to the portable terminal. The portable terminal can operate under the operating power transmitted from the portable terminal mounting base. This enables the portable terminal to suppress electric power consumption. In the case that the portable terminal mounting base has the capability of charging a battery of the portable terminal, suppressing electric power consumption in the portable terminal brings the effect of preventing electric power of the battery of the portable terminal from being undesirably consumed during its charging operation. Thus, it becomes possible to appropriately charge the battery of the portable terminal. In short, it becomes possible to not only appropriately perform RF communication between the portable terminal and the portable terminal mounting base but also appropriately charge the battery of the portable terminal.

According to the portable terminal system of the present invention, it is preferable that the first RFID means modulates a carrier wave transmitted from the second RFID means based on data without amplifying the carrier wave, and transmits the carrier wave with the superimposed data to the second RFID means. This arrangement will bring the effect of suppressing electric power consumption if smaller communication distances are not dissatisfactory.

According to the portable terminal system of the present invention, it is preferable that the first RFID means amplifies a carrier wave transmitted from the second RFID means and modulates the amplified carrier wave based on the data, and transmits the carrier wave with the superimposed data to the second RFID means. This arrangement will bring the effect of increasing the communication distance if larger electric power consumption is acceptable.

According to the portable terminal system of the present invention, it is preferable that the first RFID means produces a carrier wave and modulates the carrier wave based on the data, and transmits the carrier wave with the superimposed data to the second RFID means. This arrangement makes it possible to arbitrarily set the communication distance with reference to the transmission power of the carrier wave and will bring the effect of realizing a flexible system.

According to the portable terminal system of the present invention, it is preferable that the second RFID means operates as a RFID slave station having identification information inherent to the portable terminal mounting base. The first RFID means performs RF communication with the RFID tag, and also operates as a RFID master station performing RF communication with the second RFID means under the condition that identified result of identification information is true in the communication with the second RFID means operating as a RFID slave station. Accordingly, the portable terminal does not perform RF communication unconditionally with all of the portable terminal mounting bases. Only when identified result of the identification information of a concerned portable terminal mounting base is true, the portable terminal performs RF communication with this portable terminal mounting base. Thus, it becomes possible to enhance the security of the communication performed between the portable terminal and the portable terminal mounting bases.

According to the portable terminal system of the present invention, it is preferable that the first RFID means performs RF communication with the RFID tag according to first RF communication procedure. And, the first RFID means performs RF communication with the second RFID means operating as a RFID slave station according to second RF communication procedure which is different from the first RF communication procedure. This arrangement makes it possible to arbitrarily set a communication procedure used when the portable terminal reads data from the RFID tag, irrelevant to a communication procedure used when the portable terminal transmits the data of the RFID tag to the portable terminal mounting base. For example, it will be possible to arbitrarily set the communication speed, communication distance, and communication frequency. As a result, it becomes possible to realize a flexible system.

According to the portable terminal system of the present invention, it is preferable that the first RFID means, when performing RF communication with the RFID tag according to the first RF communication procedure, supplies operating power to the RFID tag. And, the first RFID means, when performing RF communication with the second RFID means operating as a RFID slave station according to the second RF communication procedure, supplies no operating power to the second RFID means.

This arrangement enables the portable terminal to supply operating power to the RFID tag under a condition that the RFID tag cannot produce operating power. With this arrangement, the RFID tag can operate under the operating power transmitted from the portable terminal and can transmit its data to the portable terminal. The portable terminal can read the data received from the RFID tag. Furthermore, the above arrangement enables the portable terminal to supply no operating power to the portable terminal mounting base. The portable terminal can suppress electric power consumption. In the case that the portable terminal mounting base has the capability of charging a battery of the portable terminal, suppressing electric power consumption in the portable terminal brings the effect of preventing electric power of the battery of the portable terminal from being undesirably consumed during its charging operation. Thus, it becomes possible to appropriately charge the battery of the portable terminal. In short, it becomes possible to not only appropriately perform RF communication between the portable terminal and the portable terminal mounting base but also appropriately charge the battery of the portable terminal.

Furthermore, in order to accomplish the above and other related objects, the present invention provides a portable terminal mounting base having an arrangement for mounting a portable terminal which includes a first RFID means capable of performing RF communication with a RFID tag and operating under an operating power supplied from a battery. The portable terminal mounting base includes an external communication means capable of performing data communication with an external apparatus and a second RFID means capable of performing RF communication with the first RFID means of the portable terminal. The portable terminal mounting base transmits data via the external communication means to the external apparatus, when the first RFID means transmits the data to the second RFID means based on RF communication. And, the portable terminal mounting base transmits data via the second RFID means to the first RFID means based on RF communication, when the external apparatus transmits the data to the external communication means. The portable terminal mounting base of the present invention in characterized by including the second RFID means capable of performing RF communication with the first RFID means which is originally equipped in the portable terminal for performing RF communication with the RFID tag. For example, when the portable terminal is placed on the portable terminal mounting base, the first RFID means of the portable terminal transmits data to the second RFID means of the portable terminal mounting base based on RF communication. Then, the portable terminal mounting base transmits the received data via the external communication means to the external apparatus. Meanwhile, when the external apparatus transmits data to the external communication means, the portable terminal mounting base transmits the received data via the second RFID means to the first RFID means of the portable terminal based on RF communication.

Providing the second RFID means in the portable terminal mounting base brings the effect of simplifying the overall hardware arrangement of the portable terminal because a common interface can be used to read the data from the RFID tag and also transmit the data having been read from the RFID tag to the portable terminal mounting base. Furthermore, as an overall system, the data of the RFID tag having been read into the portable terminal can be appropriately transmitted from the portable terminal to the external apparatus via the portable terminal mounting base.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 2:
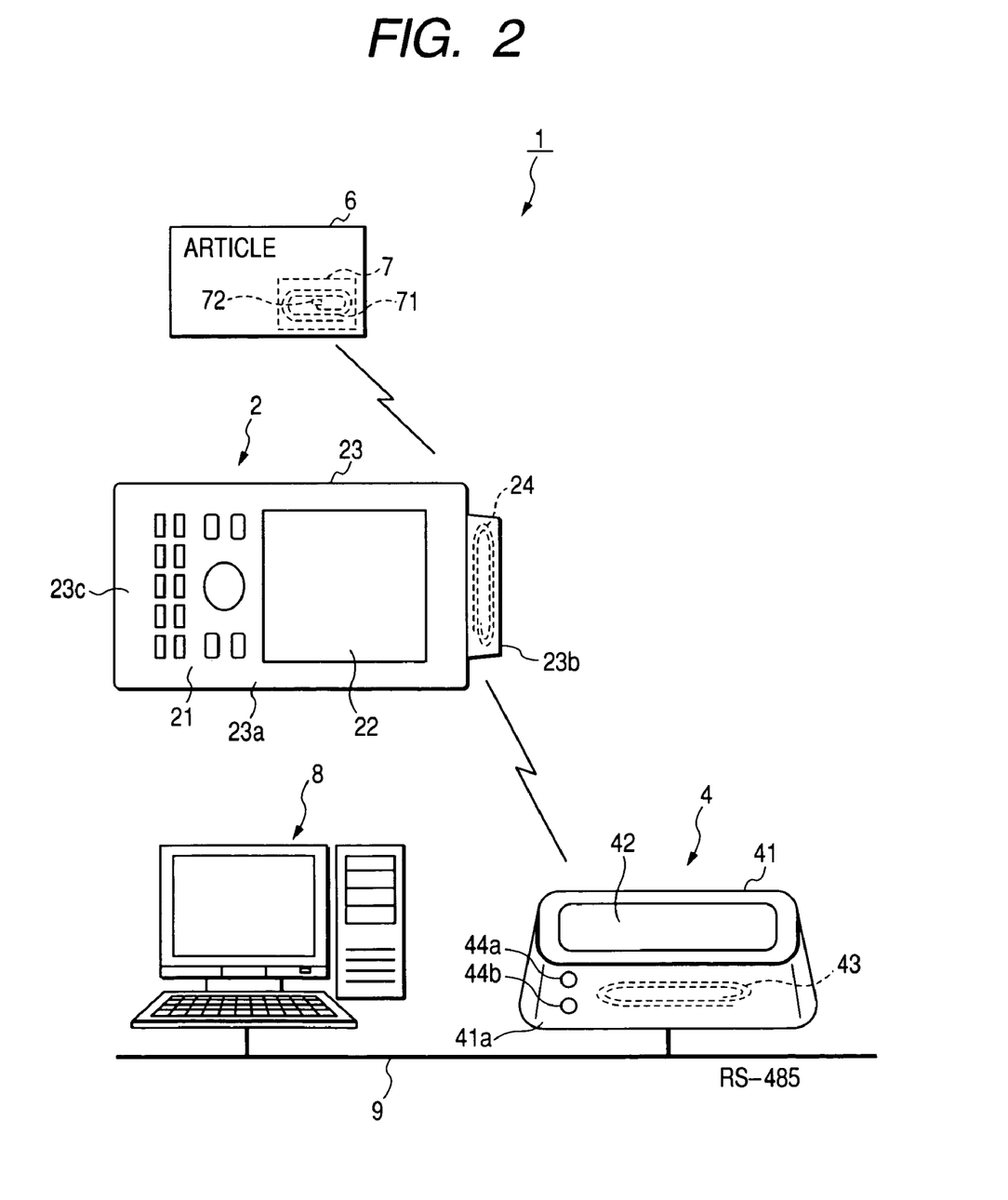
FIG. 2 is a schematic view showing an overall arrangement of the portable terminal system.

Hereinafter, a preferred embodiment of the present invention will be explained with reference to attached drawings. FIG. 2 is a schematic view showing an overall arrangement of a portable terminal system in accordance with the preferred embodiment of the present invention. The portable terminal system 1 includes a portable terminal 2 having a RFID tag (i.e. radio frequency ID tag) reading function and an image reading function and a portable terminal mounting base (hereinafter, referred to as mounting base) 4 having an arrangement for mounting the portable terminal 2.

The portable terminal 2 includes an operating section 21 allowing a user to manipulate or input instruction or data through keys provided thereon and a display section 22 (e.g. liquid crystal display) which are disposed on a front surface 23a of a casing 23. Furthermore, the portable terminal 2 includes a loop-coil antenna 24 accommodated in an upper part 23b of the casing 23, for performing RF communication with a RFID tag 7 attached or incorporated in an article or product to be managed 6 and for performing RF communication with the mounting base 4. The above-described RFID tag 7 includes a loop-coil antenna 71 and an IC chip 72 for performing RF communication with the portable terminal 2.

On the other hand, the mounting base 4 has a casing 41 configured into a predetermined shape having a recess 42 into which a lower part 23c of the casing 23 of the portable terminal 2 is inserted. In other words, the portable terminal 2 is stably held on the mounting base 4 by inserting the lower part 23c of the casing 23 into the recess 42 of the mounting base 4. In this case, the mounting base 4 has a charging function for charging a battery 25 of the portable terminal 2 (refer to FIG. 1). More specifically, in a condition that the portable terminal 2 is placed in a normal position, electric power of a commercial power source is supplied to the battery 25 of the portable terminal 2 to charge the battery 25. Furthermore, the mounting base 4 includes a loop-coil antenna 43 accommodated in the casing 41 to perform RF communication with the portable terminal 2, and two LEDs 44a and 44b disposed on a side wall 41a of the casing 41. The LED 44a is for indicating progress of charging operation of the battery 25 of the portable terminal 2, while the LED 44b is for indicating accomplishment of charging (i.e. full charging) of the battery 25. It is however possible to replace these LEDs 44a and 44b with a liquid crystal display indicating the state of charging operation.

The mounting base 4 is connected with a host computer 8 (i.e. an external apparatus of the present invention) via a cable 9 through a connection configuration, for example, in compliance with RS-485 communication standards (i.e. bus-type multipoint connection). Although this embodiment is based on an arrangement using the connection configuration in compliance with RS-485 communication standards for connecting the mounting base 4 and the host computer 8, it is possible to use a connection configuration in compliance with RS-232C communication standards (point-to-point connect) or a connection configuration in compliance with RS-422 communication standards. Furthermore, it is possible to use a USB interface for connecting the mounting base 4 and the host computer 8.

Figure 1:
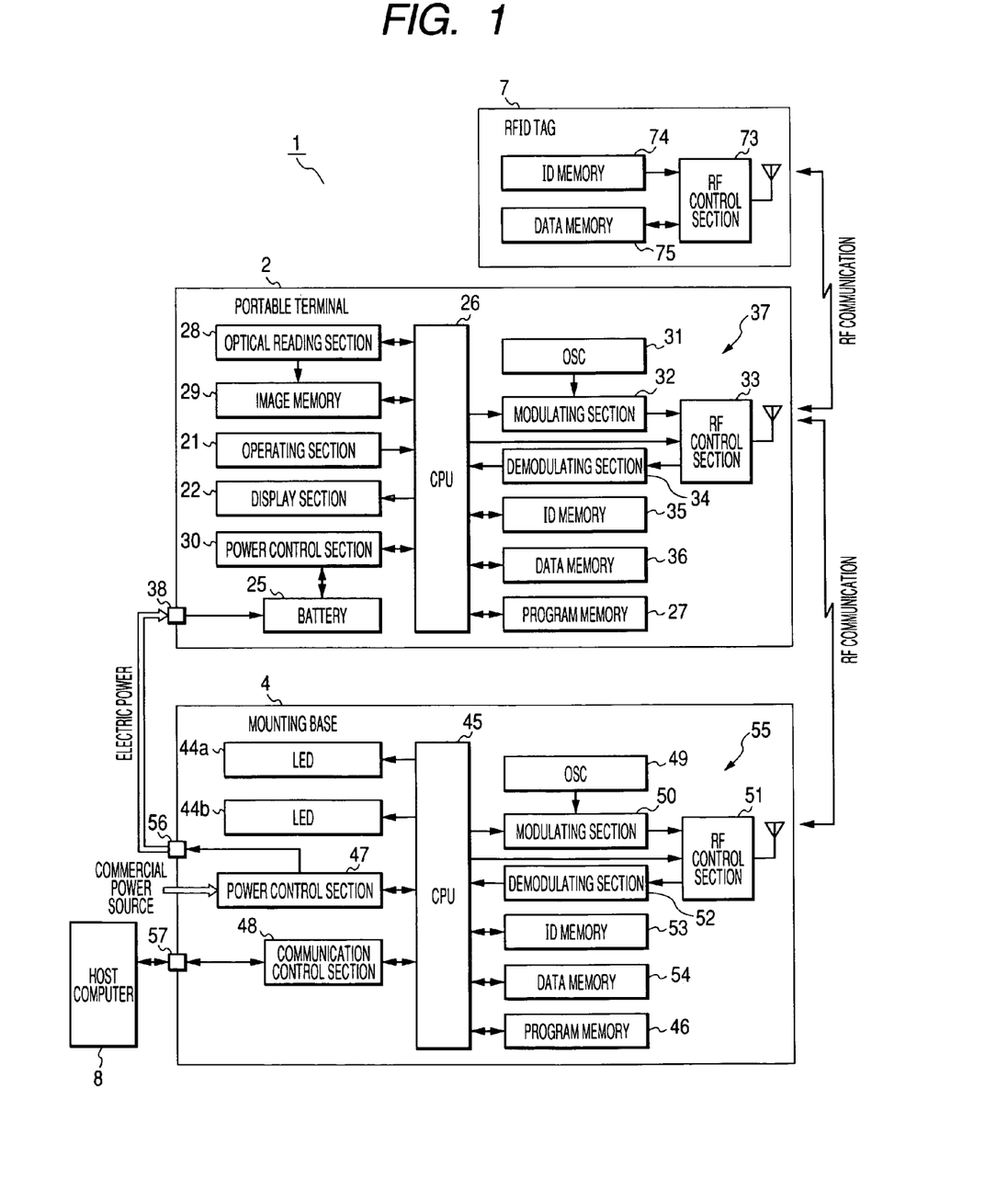
FIG. 1 is a block diagram showing an overall arrangement of a portable terminal system including a portable terminal, a portable terminal mounting base, and a RFID tag in accordance with a preferred embodiment of the present invention.

FIG. 1 is a block diagram showing an electric arrangement of the above-described portable terminal system 1. In addition to the above-described operating section 21 and the display section 22, the portable terminal 2 includes CPU 26, a program memory 27, an optical reading section 28, an image memory 29, a power control section 30, an oscillator (OSC)

31, a modulating section 32, a RF control section 33, a demodulating section 34, an ID memory 35, and a data memory 36. CPU 26 controls operations of the portable terminal 2. The program memory 27 stores control programs to be executed in CPU 26. The optical reading section 28 reads one-dimensional codes and/or two-dimensional codes, as optical information, which are for example printed or attached on articles or products to be managed. The image memory 29 stores images having been read by the optical reading section 28. The power control section 30 controls electric power supplied from the battery 25. The oscillator 31 outputs carrier waves. The modulating section 32 modulates the carrier wave produced from the oscillator 31 based on the data produced from CPU 26. The RF control section 33 controls RF communication performed between the portable terminal 2 and the RFID tag 7 or between the portable terminal 2 and the mounting base 4. The demodulating section 34 demodulates the carrier wave to extract the data when the modulated carrier wave is transmitted from the RFID tag 7 or the mounting base 4 to the RF control section 33. The ID memory 35 stores a portable terminal ID (i.e. identification information of the portable terminal of the present invention) inherent to the individual portable terminal 2. The data memory 36 stores various data. According to this embodiment, CPU 26, program memory 27, oscillator 31, modulating section 32, RF control section 33, demodulating section 34, ID memory 35, and data memory 36 cooperatively arrange a RFID section 37 (i.e. first RFID means of the present invention).

On the other hand, the mounting base 4 has the following arrangement. In addition to the above-described LEDs 44a and 44b, the mounting base 4 includes CPU 45, a program memory 46, a power control section 47, a communication control section 48 (i.e. external communication means of the present invention), an oscillator (OSC) 49, a modulating section 50, a RF control section 51, a demodulating section 52, an ID memory 53, and a data memory 54. CPU 45 controls operations of the mounting base 4. The program memory 46 stores control programs to be executed by CPU 45. The power control section 47 receives electric power from a commercial power source and controls the electric power supplied to the battery 25 of the portable terminal 2. The communication control section 48 controls data communication performed between the mounting base 4 and the host computer 8. The oscillator 49 produces carrier waves. The modulating section 50 modulates the carrier wave produced from the oscillator 49 based on the data produced from CPU 45. The RF control section 51 controls RF communication performed between the mounting base 4 and the portable terminal 2. The demodulating section 52 demodulates the carrier wave to extract the data when the modulated carrier wave is transmitted from the portable terminal 2 to the RF control section 51. The ID memory 53 stores a mounting base ID (i.e. identification information of the portable terminal mounting base of the present invention) inherent to the individual mounting base 4. The data memory 54 stores various data. According to this embodiment, CPU 45, program memory 46, oscillator 49, modulating section 50, RF control section 51, demodulating section 52, ID memory 53, and data memory 54 cooperatively arrange a RFID section 55 (i.e. second RFID means of the present invention).

The RFID tag 7 includes a RF control section 73, an ID memory 74, and a data memory 75. The RF control section 73 controls RF communication performed between the RFID tag 7 and the portable terminal 2. The ID memory 74 stores a tag ID inherent to the individual RFID tag 7. The data memory 75 stores various data.

Furthermore, according to the above-described arrangement, the charging terminal 38 of the portable terminal 2 is electrically connected to the charging terminal 56 of the mounting base 4 in a condition that the portable terminal 2 is normally placed on the mounting base 4. To charge the battery 25, electric power is supplied from the power control section 47 of the mounting base 4 to the battery 25 of the portable terminal 2 via the charging terminals 56 and 38. Furthermore, the host computer 8 is connected via the cable 9 to the connecting terminal 57, to perform data communication between the mounting base 4 and the host computer 8.

Hereinafter, the arrangement of the RFID section 37 (more specifically, the RF control section 33) of the portable terminal 2 will be explained with reference to FIG. 3. The RFID section 37 can perform the following RF communication controls depending on the arrangement of the RF control section 33.

(1) Passive mode RF communication control;
(2) Semi-active mode RF communication control; and
(3) Active mode RF communication control.

Hereinafter, these controls are successively explained in more detail.

(1) Passive Mode RF Communication Control

Figure 3A:
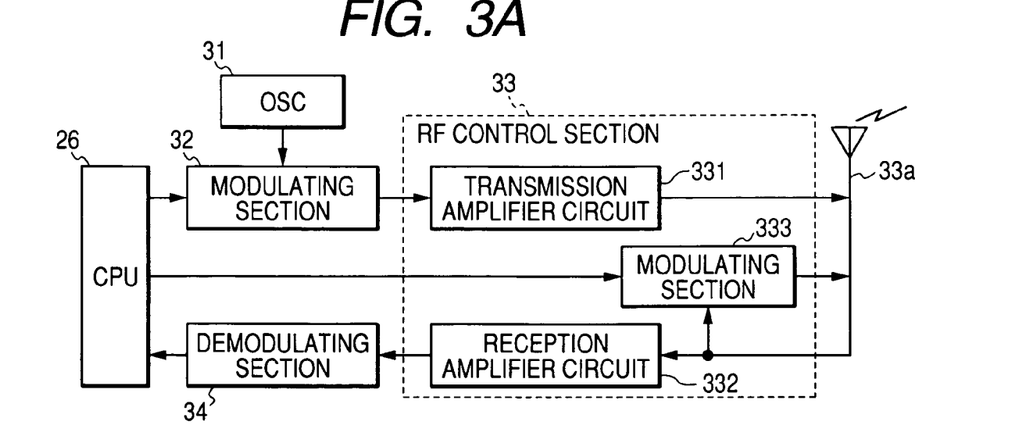
FIGS. 3A to 3C are block diagrams each showing a practical arrangement of a RFID section of the portable terminal.

The RFID section 37 can perform a passive mode RF communication control when the RF control section 33 has an arrangement shown in FIG. 3A. In this case, the RF control section 33 consists of a transmission amplifier circuit 331, a reception amplifier circuit 332, and a modulating section 333. The transmission amplifier circuit 331 amplifies the carrier wave being produced from the oscillator 31 and modulated based on the data in the modulating section 32. The reception amplifier circuit 332 amplifies the carrier wave being received by the antenna 33a when this carrier wave is transmitted from the RFID tag 7 or from the mounting base 4. The modulating section 333 modulates the carrier wave based on the data produced from CPU 26, when the antenna 33a receives the carrier wave from the RFID tag 7 or from the mounting base 4.

According to this arrangement, the RFID section 37 can operate as a RFID master station. In this case, the data stored in the data memory 36 is supplied to the modulating section 32. The modulating section 32 receives a carrier wave produced from the oscillator 31 and modulates this carrier wave based on the data. Thus, the RFID section 37 transmits the data superimposed on the self-produced carrier wave. On the other hand, the RFID section 37 can operate as a RFID slave station (having the function equivalent to the RFID tag). In this case, the data stored in the data memory 36 is supplied to the modulating section 333. The modulating section 333 receives a carrier wave from the antenna 33a which is transmitted from the mounting base 4, and modulates the received carrier wave based on the data. Thus, the RFID section 37 superimposes the data on the carrier wave transmitted from the mounting base 4 and transmits the data superimposed on the carrier wave to the mounting base 4.

(2) Semi-Active Mode RF Communication Control

Figure 3B:
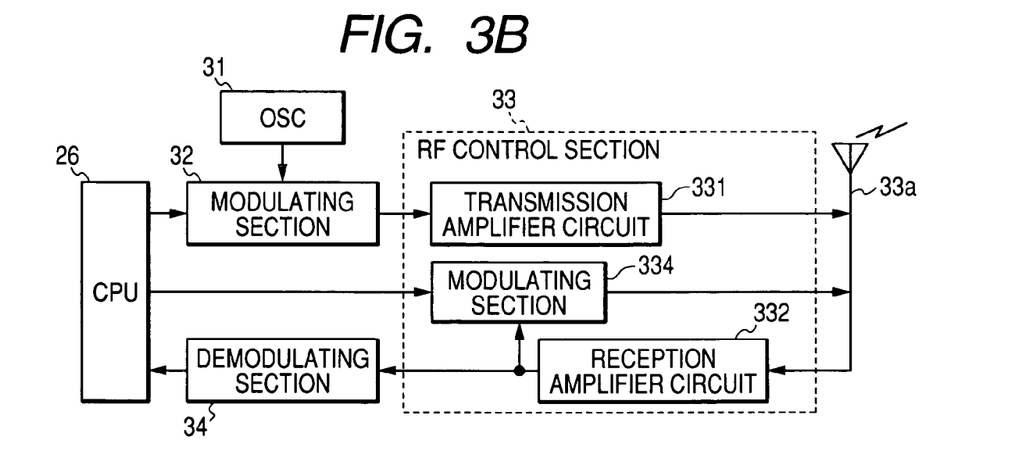

The RFID section 37 can perform a semi-active mode RF communication control when the RF control section 33 has an arrangement shown in FIG. 3B. In this case, the RF control section 33 includes a modulating section 334 in addition to the above-described transmission amplifier circuit 331 and the reception amplifier circuit 332. The reception amplifier circuit 332 amplifies the carrier wave received by the antenna 33a. The modulating section 334 receives the amplified carrier wave from the reception amplifier circuit 332 and modulates it based on the data produced from CPU 26.

According to this arrangement, the RFID section 37 can operate as a RFID master station. In this case, like the above-described passive mode RF communication control, the data stored in the data memory 36 is supplied to the modulating section 32. The modulating section 32 receives a carrier wave produced from the oscillator 31 and modulates this carrier wave based on the data. Thus, the RFID section 37 transmits the data superimposed on the self-produced carrier wave. On the other hand, the RFID section 37 can operate as a RFID slave station. In this case, the data stored in the data memory 36 is supplied to the modulating section 334. The modulating section 333 receives a carrier wave from the antenna 33a which is transmitted from the mounting base 4 and amplified by the reception amplifier circuit 332, and modulates the received amplified carrier wave based on the data. Thus, the RFID section 37 superimposes the data on the carrier wave being transmitted from the mounting base 4 and being amplified.

(3) Active Mode RF Communication Control

Figure 3C:
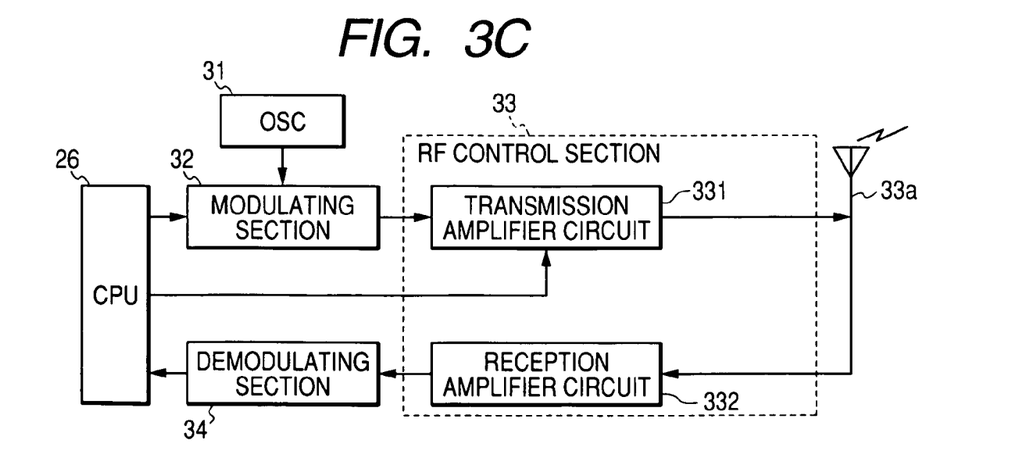

The RFID section 37 can perform a RF communication control when the RF control section 33 has an arrangement shown in FIG. 3C. In this case, the RF control section 33 consists of the above-described transmission amplifier circuit 331 and the reception amplifier circuit 332.

According to this arrangement, the RFID section 37 can operate as a RFID master station. In this case, like the above-described passive mode RF communication control or the semi-active mode RF communication control, the data stored in the data memory 36 is supplied to the modulating section 32. The modulating section 32 receives a carrier wave produced from the oscillator 31 and modulates this carrier wave based on the data. Thus, the RFID section 37 transmits the data superimposed on the self-produced carrier wave. On the other hand, the RFID section 37 can operate as a RFID slave station. In this case, the data stored in the data memory 36 is supplied to the modulating section 32. The modulating section 32 modulates the carrier wave produced from the oscillator 31 based on the data. Thus, the RFID section 37 transmits the data superimposed on the self-produced carrier wave. According to this arrangement, changing an amplification factor of the transmission amplifier circuit 331 makes it possible to realize transmission of the data with a smaller transmission power compared with the case that the RFID section 37 operates as a RFID master station.

Figure 4:
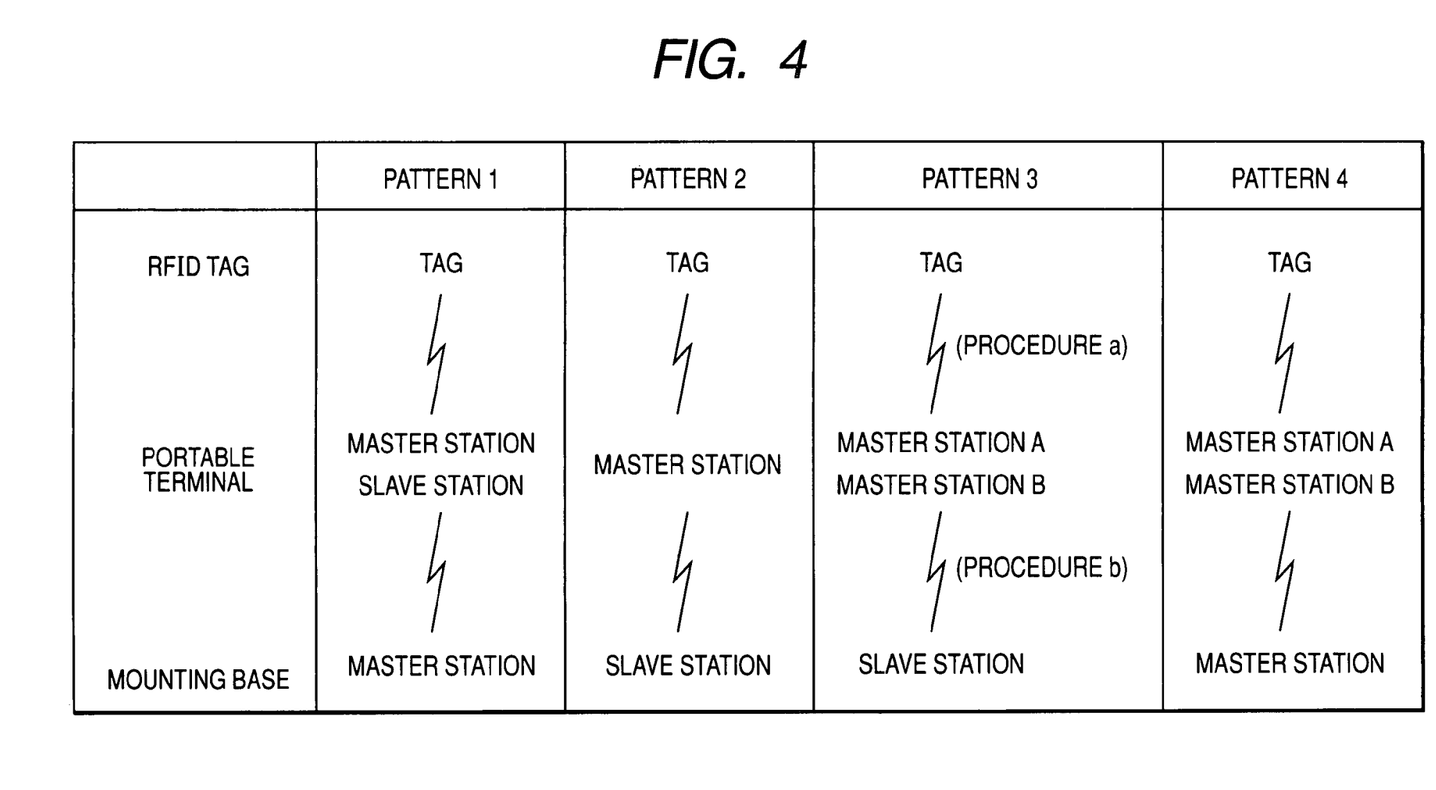
FIG. 4 is a view showing various patterns of communication between a RFID master station and a RFID slave station.

As described above, the RFID section 37 of the portable terminal 2 can selectively operate as a RFID master station or a RFID slave station. Similarly, the RFID section 55 of the mounting base 4 can selectively operate as a RFID master station or a RFID slave station. FIG. 4 shows various operation patterns of communication between the portable terminal 2 and the mounting base 4 which can respectively operate as a RFID master station or a RFID slave station.

According to pattern 1, the RFID section 37 of the portable terminal 2 operates as a RFID master station with respect to the communication with the RFID tag 7 and also operates as a RFID slave station with respect to the communication with the RFID section 55 of the mounting base 4. The RFID section 55 of the mounting base 4 operates as a RFID master station with respect to the communication with the RFID section 37 of the portable terminal 2.

Furthermore, according to pattern 2, the RFID section 37 of the portable terminal 2 operates as a RFID master station with respect to the communication with the RFID tag 7 and also operates as a RFID master station with respect to the communication with the RFID section 55 of the mounting base 4. The RFID section 55 of the mounting base 4 operates as a RFID slave station with respect to the communication with the RFID section 37 of the portable terminal 2.

Furthermore, according to pattern 3, like the above-described pattern 2, the RFID section 37 of the portable terminal 2 operates as a RFID master station 'A' with respect to the communication with the RFID tag 7 and also operates as a RFID master station 'B' with respect to the communication with the RFID section 55 of the mounting base 4. The RFID section 55 of the mounting base 4 operates as a RFID slave station with respect to the communication with the RFID section 37 of the portable terminal 2. According to this pattern, the communication between the RFID tag 7 and the portable terminal 2 is performed based on the RF communication procedure 'a' (i.e. first RF communication procedure of the present invention). The communication between the portable terminal 2 and the mounting base 4 is performed based on the RF communication procedure 'b' (i.e. second RF communication procedure of the present invention). The RF communication procedure 'b' is different from the RF communication procedure 'a'.

Furthermore, according to pattern 4, the RFID section 37 of the portable terminal 2 operates as a RFID master station 'A' with respect to the communication with the RFID tag 7 and also operates as a RFID master station 'B' with respect to the communication with the RFID section 55 of the mounting base 4. The RFID section 55 of the mounting base 4 operates as a RFID master station with respect to the communication with the RFID section 37 of the portable terminal 2.

Figure 5:
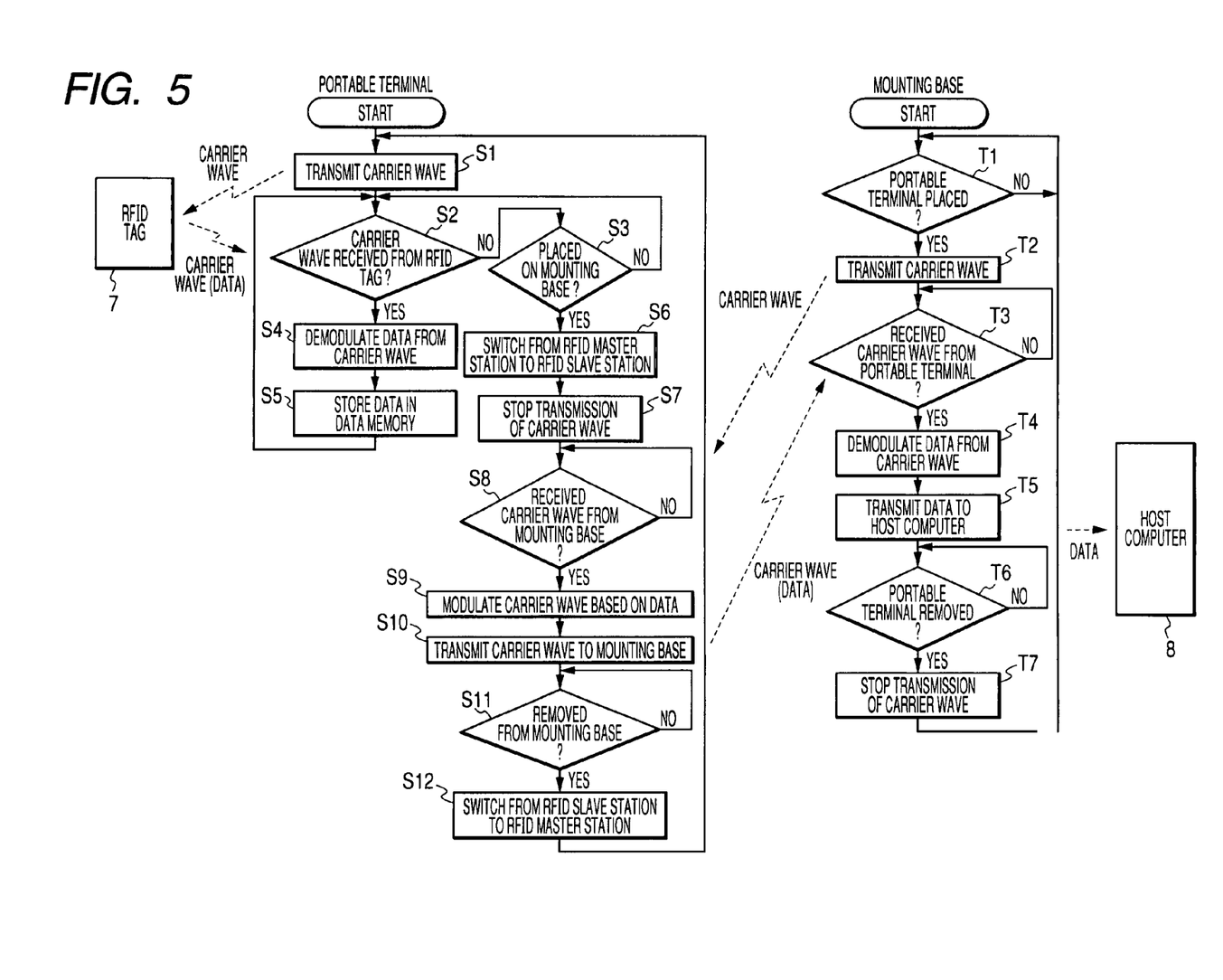
FIG. 5 is a flowchart showing the processing executed by the portable terminal and the mounting base.

Next, functions of the above-described portable terminal system will be explained with reference to FIG. 5. FIG. 5 is a flowchart showing the processing performed by the portable terminal 2 and the mounting base 4. The flowchart shown in FIG. 5 is based on a case that the RFID section 37 of the portable terminal 2 performs the passive mode RF communication control according to the pattern 1, as a representative example selected from the above-described four patterns 1 to 4.

In the portable terminal 2, CPU 26 causes the RFID section 37 to operate as a RFID master station when the portable terminal 2 is operating (i.e. turned on) and is not placed on the mounting base 4. First, CPU 26 causes the RF control section 33 to transmit carrier waves (refer to step S1). Then, CPU 26 makes a judgment as to whether or not the RF control section 33 has received a carrier wave transmitted from the RFID tag 7 (refer to step S2). Then, if judgment result is NO in step S2, CPU 26 makes a judgment as to whether or not the portable terminal 2 is placed on the mounting base 4 (refer to step S3). If judgment result is NO in step S3, CPU 26 returns to the above-described step S2.

When the portable terminal 2 approaches to the RFID tag 7, the RFID tag 7 transmits a carrier wave in response to a carrier wave transmitted from the portable terminal 2. When the RF control section 33 has received a carrier wave transmitted from the RFID tag 7 (i.e. YES in step S2), CPU 26 causes the demodulating section 34 to demodulate the carrier wave transmitted from the RFID tag 7 to extract the data (refer to step S4). Then, CPU 26 causes the data memory 36 to store the extracted data (refer to step S5). Then, CPU 26 returns to the above-described step S2. Furthermore, when the portable terminal 2 is placed on the mounting base 4 (i.e. YES in step S3), CPU 26 switches the operation mode of the RFID section 37 from the RFID master station to the RFID slave station (refer to step S6). Then, CPU 26 causes the RF control section 33 to stop transmission of carrier waves (refer to step S7). Then, CPU 26 makes a judgment as to whether or not the RF control section 33 has received a carrier wave transmitted from the mounting base 4 (refer to step S8).

Meanwhile, CPU 45 in the mounting base 4 makes a judgment as to whether or not the portable terminal 2 is placed on the mounting base 4 (refer to step T1) in the condition that the mounting base 4 is operating (i.e. when mounting base 4 is connected to the commercial power source). When the portable terminal 2 is placed on the mounting base 4 (i.e. YES is step T1), CPU 45 causes the RFID section 55 to operate as a RFID master station. CPU 45 causes the RF control section 51 to transmit carrier waves (refer to step T2). Then, CPU 45 makes a judgment as to whether or not the RF control section 51 has received a carrier wave transmitted from the portable terminal 2 (refer to step T3).

Returning to the portable terminal 2, when the RF control section 33 has received a carrier wave transmitted from the mounting base 4 (i.e. YES in step S8), CPU 26 modulates the carrier wave transmitted from the mounting base 4 based on the data stored in the data memory 36 (more specifically, the data having been read from the RFID tag 7) (refer to step S9). Then, the data superimposed on a carrier wave is transmitted to the mounting base 8 (refer to step S10). Then, CPU 26 makes a judgment as to whether or not the portable terminal 2 is removed from the mounting base 4 (refer to step S11). When the portable terminal 2 is removed from the mounting base 4 (i.e. YES in step S12), CPU 26 switches the operation mode of the RFID section 37 from the RFID slave station to the RFID master station (refer to step S12). Then, CPU 26 returns to the above-described step S1 to repetitively perform the above-described processing steps.

On the other hand, in the mounting base 4, when the RF control section 51 has received a carrier wave transmitted from the portable terminal 2 (i.e. YES in step T3), CPU 45 causes the demodulating section 52 to demodulate the carrier wave transmitted from the portable terminal 2 to extract the data (refer to step T4). Then, CPU 45 causes the communication control section 48 to transmit the extracted data (more specifically, the data having been read from the RFID tag 7 into the portable terminal 2) to the host computer 8 (refer to step T5). Then, CPU 45 makes a judgment as to whether or not the portable terminal 2 is removed from the mounting base 4 (refer to step T6). When the portable terminal 2 is removed from the mounting base 4 (i.e. YES in step T6), CPU 45 causes the RF control section 57 to stop transmission of carrier waves (refer to step T7). Then, CPU 45 returns to the above-described step T1 to repetitively perform the above-described processing steps.

Through the above-described sequential processing steps, as soon as the portable terminal 2 is placed on mounting base 4, the data having been read from the RFID tag 7 into the portable terminal 2 is transmitted from the portable terminal 2 to the mounting base 4. Then, the data being transmitted from the portable terminal 2 to the mounting base 4 is further transmitted from the mounting base 4 to the host computer 8. As a result, the data having been read from the RFID tag 7 into the portable terminal 2 is transmitted via the mounting base 4 to the host computer 8.

The above-described embodiment is based on the arrangement that the data having been read from the RFID tag 7 into the portable terminal 2 is transmitted via the mounting base 4 to the host computer 8. However, it is possible to use an opposite arrangement. According to such a modified arrangement, the data having been transmitted from the host computer 8 to the mounting base 4 is transmitted via the mounting base 4 to the portable terminal 2 as soon as the portable terminal 2 is placed on the mounting base 4. Then, the data being transmitted from the mounting base 4 to the portable terminal 2 is further transmitted from the portable terminal 2 to the RFID tag 4. As a result, the data memorized in the host computer 8 is transmitted to (i.e. written into) the RFID tag 7.

The above-described embodiment is based on the arrangement that the data is quickly transmitted to the host computer 8 when the data is transmitted from the portable terminal 2 to the mounting base 4 as soon as the portable terminal 2 is placed. However, it is possible to modify the arrangement in the following manner. The data having being transmitted from the portable terminal 2 is temporarily stored in the data memory 54. Then, the data temporarily stored in the data memory 54 is transferred to the host computer 8 only when the predetermined data transmission conditions (for example, when the data amount exceeds a predetermined level, when the time reaches a pre-designated time, when the load of the host computer 8 is less than a predetermined level, etc.) are satisfied.

Furthermore, it is possible to modify the above-described arrangement in the following manner. In the communication between the portable terminal 2 and the mounting base 4, a portable terminal ID inherent to the portable terminal 2 and a mounting base ID inherent to the mounting base 4 are mutually transmitted and received. The RF communication between the portable terminal 2 and the mounting base 4 is performed only when identified result (check result) is true with respect to the portable terminal ID and the mounting base ID.

Furthermore, according to the above-described pattern 1, it is possible to arrange the portable terminal 2 so as to supply operating power to the RFID tag 7 when the portable terminal 2 operates as a RFID master station. According to such an arrangement, even in a situation that the RFID tag 7 cannot produce its operating power, the RFID tag 7 can operate under the operating power supplied from the portable terminal 2. Thus, the data can be transmitted from the RFID tag 7 to the portable terminal 2. The portable terminal 2 can read the data of the RFID tag 7. Furthermore, it is possible to arrange the mounting base 4 so as to supply operating power to the portable terminal 2 when the portable terminal 2 operates as a RFID slave station. The portable terminal 2 can operate under the operating power supplied from the mounting base 4. Accordingly, the portable terminal 2 can save electric power stored in its battery 25.

Furthermore, according to the above-described pattern 2 or pattern 3, it is possible to arrange the portable terminal 2 operating as a RFID master station so as to supply no operating power to the mounting base 4 operating as a RFID slave station. According to this arrangement, the portable terminal 2 can save electric power stored in its battery 25.

As described above, according to the portable terminal system 1 of this embodiment, the mounting base 4 includes the RFID section 55 capable of performing RF communication with the RFID section 37 of the portable terminal 2. As soon as the portable terminal 2 is placed on the mounting base 4, the RFID section 37 and the RFID section 55 start RF communication. Thus, the data having been read from the RFID tag 7 into the portable terminal 2 is quickly transmitted from the portable terminal 2 to the mounting base 4. And, the data being transmitted from the portable terminal 2 to the mounting base 4 is further transmitted from the mounting base 4 to the host computer 8. Thus, the portable terminal system 1 of this embodiment enables the portable terminal 2 to use a common interface to read the data from the RFID tag 7 and also transmit the data having been read from the RFID tag 7 to the mounting base 4. And, the overall hardware arrangement of the portable terminal can be simplified. Furthermore, as an overall system, the data of the RFID tag 7 having been read into the portable terminal 2 can be appropriately transmitted from the portable terminal 2 to the host computer 8 via the mounting base 4.

Furthermore, the RF communication between the portable terminal 2 and the mounting base 4 is performed only when identified result is true with respect to the portable terminal ID inherent to the portable terminal 2 and the mounting base ID inherent to the mounting base 4. Thus, the mounting base 4 performs RF communication with the portable terminal 2 only when identified result of the portable terminal ID of this portable terminal 2 is true. Alternatively, the portable terminal 2 performs RF communication with the mounting base 4 only when identified result of the mounting base ID is true. Thus, it becomes possible to enhance the security of the communication performed between the mounting base 4 and the portable terminal 2.

Furthermore, the RFID section 37 switches its operation mode from a RFID master station to a RFID slave station in response to placement of the portable terminal 2 onto the mounting base 4. Thus, as soon as the portable terminal 2 is placed on the mounting base 4, the portable terminal 2 can quickly shift into a condition capable of transmitting the data having been read from the RFID tag 7 to the mounting base 4. On the other hand, the RFID section 37 switches its operation mode from a RFID slave station to a RFID master station in response to removal of the portable terminal 2 from the mounting base 4. Thus, as soon as the portable terminal 2 is removed from the mounting base 4, the portable terminal 2 can quickly shift into a condition capable of reading the data from the RFID tag 7.

Furthermore, in the case that the portable terminal 2 operates as a RFID master station, the portable terminal 2 supplies operating power to the RFID tag 7. According to this arrangement, even in a situation that the RFID tag 7 cannot produce its operating power, the portable terminal 2 can read the data from the RFID tag 7. Furthermore, in the case that the portable terminal 2 operates as a RFID slave station, the mounting base 4 supplies operating power to the portable terminal 2. According to this arrangement, the portable terminal 2 can reduce electric power consumption in its battery 25. In this manner, suppressing electric power consumption in the portable terminal 2 brings the effect of preventing electric power of the battery 25 of the portable terminal 2 from being undesirably consumed when the mounting base 4 charges the battery 25 of the portable terminal 2. Thus, it becomes possible to appropriately charge the battery 25 of the portable terminal 2. In short, the portable terminal system 1 of the above-described embodiment can not only appropriately perform RF communication between the portable terminal 2 and the mounting base 4 but also appropriately charge the battery 25 of the portable terminal 2.

The present invention is not narrowly limited to the above-described embodiment and accordingly can be modified in various ways. For example, the portable terminal can be held in lying position when it is placed on the mounting base. The portable terminal is, for example, a portable telephone possessing a RFID tag reading function or any other type of portable terminal. The mounting base is, for example, the one having no charging function although it has an arrangement capable of mounting the portable terminal.

What is claimed is:

1. A portable terminal system comprising:
a portable terminal including a first RFID section and a battery;
a portable terminal mounting base including a second RFID section and a communication control section and having a casing which mounts said portable terminal, wherein said first RFID section performs RF communication with both an external RFID tag and said portable terminal mounting base, and operates under an operating power supplied from said battery, said second RFID section performs RF communication with said first RFID section, and said communication control section performs data communication with an external apparatus, said portable terminal mounting base transmits first data from said communication control section to said external apparatus, after said first RFID section of said portable terminal transmits, by RF communication, the first data to said second RFID section, said portable terminal mounting base transmits, by RF communication, second data from said second RFID section to said first RFID section of said portable terminal after said external apparatus transmits the second data to said communication control section, said first RFID section operates as a RFID master station performing RF communication with said external RFID tag, and also operates as a RFID slave station storing identification information identifying said portable terminal, and said second RFID section operates as a RFID master station performing RF communication with said first RFID section after the identity of the portable terminal is verified using identification information contained in the RF communication with said first RFID section, said first RFID section operating as the RFID slave station.

2. The portable terminal system according to claim 1, wherein
said first RFID section operates selectively as said RFID master station or said RFID slave station.

3. The portable terminal system according to claim 1, wherein
said first RFID section supplies operating power to said external RFID tag when said first RFID section operates as said RFID master station and performs RF communication with said external RFID tag, and
said second RFID section supplies operating power to said first RFID section when said second RFID section performs RF communication with said first RFID section operating as said RFID slave station.

4. The portable terminal system according to claim 1, wherein
said first RFID section modulates a carrier wave transmitted from said second RFID section without amplifying said carrier wave, and transmits the carrier wave with superimposed data to said second RFID section.

5. The portable terminal system according to claim 1, wherein
said first RFID section amplifies a carrier wave transmitted from said second RFID section and modulates said amplified carrier wave, and transmits the carrier wave with superimposed data to said second RFID section.

6. The portable terminal system according to claim 1, wherein
said first RFID section produces a carrier wave and modulates said carrier wave, and transmits the carrier wave with superimposed data to said second RFID section.

7. A portable terminal system comprising:
a portable terminal including a first RFID section and a battery;

a portable terminal mounting base including a second RFID section and a communication control section and having a casing which mounts said portable terminal, wherein said first RFID section performs RF communication with both an external RFID tag and said portable terminal mounting base, and operates under an operating power supplied from said battery, said second RFID section performs RF communication with said first RFID section, and said communication control section performs data communication with an external apparatus, said portable terminal mounting base transmits first data from said communication control section to said external apparatus, after said first RFID section of said portable terminal transmits, by RF communication, the first data to said second RFID section, said portable terminal mounting base transmits, by RF communication, second data from said second RFID section to said first RFID section of said portable terminal after said external apparatus transmits the second data to said communication control section, said second RFID section operates as a RFID slave station storing identification information identifying said portable terminal mounting base, and said first RFID section performs RF communication with said external RFID tag, and also operates as a RFID master station performing RF communication with said second RFID section after the identity of the portable terminal mounting base is verified using identification information contained in an RF communication with said second RFID section operating as a RFID slave station.

8. The portable terminal system according to claim 7, wherein said first RFID section performs RF communication with said external RFID tag according to first RF communication procedure, and said first RFID section performs RF communication with said second RFID section operating as a RFID slave station according to second RF communication procedure which is different from said first RF communication procedure.

9. The portable terminal system according to claim 8, wherein said first RFID section, when performing RF communication with said external RFID tag according to the first RF communication procedure, supplies operating power to said external RFID tag, and said first RFID section, when performing RF communication with said second RFID section operating as a RFID slave station according to the second RF communication procedure, supplies no operating power to said second RFID section.

10. A mounting base for mounting a portable terminal including a first RFID section and a battery, the first RFID section performing RF communication with an external RFID tag and the mounting base and operating under an operating power supplied from the battery, the mounting base comprising;

a casing which mounts the portable terminal;

a second RFID section which performs RF communication with the first RFID section; and a communication control section which performs data communication with an external apparatus, wherein said communication control section transmits first data to said external apparatus, after the first RFID section of the portable terminal transmits, by RF communication, the first data to said second RFID section, said second RFID section transmits, by RF communication, second data to the first RFID section of the portable terminal after said external apparatus transmits the second data to said communication control section, said first RFID section operates as a RFID master station performing RF communication with said external RFID tag, and also operates as a RFID slave station storing identification information identifying said portable terminal, and said second RFID section operates as a RFID master station performing RF communication with said first RFID section after the identity of the portable terminal is verified using identification information contained in the RF communication with said first RFID section, said first RFID section operating as the RFID slave station.

11. A mounting base for mounting a portable terminal including a first RFID section and a battery, the first RFID section performing RF communication with an external RFID tag and the mounting base and operating under an operating power supplied from the battery, the mounting base comprising:

a casing which mounts the portable terminal;

a second RFID section which performs RF communication with the first RFID section; and a communication control section which performs data communication with an external apparatus, wherein said communication control section transmits first data to said external apparatus, after the first RFID section of the portable terminal transmits, by RF communication, the first data to said second RFID section, said second RFID section transmits, by RF communication, second data to the first RFID section of the portable terminal after said external apparatus transmits the second data to said communication control section, said second RFID section operates as a RFID slave station storing identification information identifying said mounting base, and said first RFID section performs RF communication with said external RFID tag, and also operates as a RFID master station performing RF communication with said second RFID section after the identity of the mounting base is verified using identification information contained in an RF communication with said second RFID section operating as a RFID slave station.

* * * * *